United States Patent
Igarashi et al.

(10) Patent No.: US 6,817,174 B1
(45) Date of Patent: Nov. 16, 2004

(54) FILTERING MEANS REGENERATING SYSTEM FOR DIESEL ENGINE

(75) Inventors: Tatsuki Igarashi, Tokyo (JP); Masatoshi Shimoda, Tokyo (JP); Mitsuru Hosoya, Tokyo (JP); Hironobu Mogi, Tokyo (JP); Shinya Sato, Tokyo (JP); Hiroshi Hirabayashi, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 09/691,526

(22) Filed: Oct. 18, 2000

(30) Foreign Application Priority Data

Oct. 19, 1999 (JP) .......................................... 11-296663

(51) Int. Cl.[7] .................................................. F01N 3/00
(52) U.S. Cl. ............................ 60/295; 60/280; 60/285; 60/278; 60/311
(58) Field of Search .......................... 60/311, 295, 303, 60/299, 278, 285, 280, 605.2

(56) References Cited

U.S. PATENT DOCUMENTS

| | | | | |
|---|---|---|---|---|
| 4,452,040 A | * | 6/1984 | Kobashi ....................... | 60/311 |
| 4,471,611 A | * | 9/1984 | Watanabe ..................... | 60/311 |
| 4,685,291 A | * | 8/1987 | Ha ............................... | 60/286 |
| 4,747,264 A | * | 5/1988 | Santiago et al. .............. | 60/274 |
| 4,813,233 A | * | 3/1989 | Vergeer et al. ............... | 60/311 |
| 4,835,963 A | * | 6/1989 | Hardy .......................... | 60/280 |
| 4,835,964 A | * | 6/1989 | Kume et al. .................. | 60/285 |
| 4,902,487 A | * | 2/1990 | Cooper et al. ............ | 423/215.5 |
| 5,050,376 A | * | 9/1991 | Stiglic et al. ................ | 60/280 |
| 5,162,287 A | * | 11/1992 | Yoshimoto et al. ...... | 423/215.5 |
| 5,813,224 A | * | 9/1998 | Rao et al. ..................... | 60/274 |

FOREIGN PATENT DOCUMENTS

| | | | |
|---|---|---|---|
| JP | 03-271515 | * | 12/1991 |
| JP | 403271515 | * | 12/1991 |
| JP | 9079024 | * | 3/1997 |
| JP | 2000170526 | * | 6/2000 |

* cited by examiner

*Primary Examiner*—Thomas Denion
*Assistant Examiner*—Diem Tran
(74) *Attorney, Agent, or Firm*—Reed Smith LLP

(57) ABSTRACT

There is provided a filtering means regenerating system for a diesel engine, in which the filtering means provided in an exhaust gas passage oxidizes NO in exhaust gas of the engine into $NO_2$, and collects particulates in exhaust gas to thereby oxidize the particulates by $NO_2$ and remove the same at a temperature higher than a predetermined exhaust gas temperature. Also, an in-line fuel injection system for injecting fuel into the engine is provided with a variable timer mechanism for regulating the injection timing of fuel, and the deposit of particulates deposited on the filtering means is detected by deposit detecting means. A controller controls the variable timer mechanism based on the detection output of the deposit detecting means. The filtering means is prevented from becoming in an excessively collecting state in all operation statuses of the engine, thereby preventing a decrease in fuel economy and power performance of the engine.

20 Claims, 10 Drawing Sheets

(a) Ordinary Operation Control (b) General Regenerating Operation Control (c) Emergency Regenerating Operation Control

FILTERING MEANS REGENERATING SYSTEM FOR DIESEL ENGINE

BACKGROUND OF THE INVENTION

1. Field of the Invention

The present invention relates to a regenerating system for a filtering means for collecting particulates discharged from a diesel engine.

2. Description of the Related Art

As a system of this type, there has conventionally been known a system with a filtering means which comprises an oxidation catalyst for oxidizing NO in exhaust gas of a diesel engine into $NO_2$ provided in an exhaust pipe of the engine, and a particulate filter for collecting particulates in exhaust gas passing through this exhaust pipe provided in the exhaust pipe on the exhaust gas downstream side of the oxidation catalyst.

In the filtering means regenerating system constructed in this manner, NO in exhaust gas of the engine is oxidized into $NO_2$ by the oxidation catalyst, and particulates collected by the particulate filter are oxidized by this $NO_2$ and removed in the exhaust gas temperature range above 250 to 300° C., so that the particulate filter can be regenerated.

In the above-described conventional filtering means regenerating system, however, for example, in a case where a light-load operation is continued, the regeneration of the particulate filter becomes insufficient, and the particulate filter gradually becomes in an excessively collecting state, so that the exhaust gas pressure of the engine increases. Therefore, there is a fear of decreased fuel economy and power performance of the engine.

On the other hand, when an EGR system for recirculating some of exhaust gas of the engine to intake air is provided, the discharge amount of the particulates is increased by the increase in the exhaust gas pressure, and the EGR ratio increases, so that the amount of $NO_2$ decreases, by which the regeneration effect of the particulate filter further decreases. Therefore, the excessively collecting state proceeds acceleratedly, so that there is a fear of rapidly decreased fuel economy and power performance of the engine.

SUMMARY OF THE INVENTION

Accordingly, an object of the present invention is to provide a filtering means regenerating system for a diesel engine, in which a particulate filter is prevented from becoming in an excessively collecting state in all operation statuses of the engine, by which the fuel economy and power performance of the engine can be prevented from decreasing.

In the first aspect of a regenerating system for a filtering means of the present invention, the filtering means is provided in an exhaust gas passage of a diesel engine to oxidize NO in exhaust gas of the engine into $NO_2$, and to collect particulates in exhaust gas passing through the exhaust gas passage and to thereby oxidize the particulates by means of the $NO_2$ and remove the same at a temperature higher than a predetermined exhaust gas temperature.

The present filtering means regenerating system comprises any one apparatus selected from a group consisting of a variable timer mechanism for an in-line fuel injection system or distributor type fuel injection system, which regulates either one or both of the injection timing and injection amount of fuel injected into the engine, an EGR valve of an EGR system, which controls the flow rate of exhaust gas recirculated from the exhaust gas passage to an intake air passage of the engine, a variable stator blade provided in a turbocharger for supercharging intake air in the intake air passage by means of energy of the exhaust gas to regulate the amount of intake air supercharged into the intake air passage, a variable valve timing mechanism for changing the opening/closing timing and lifts of an intake air valve and exhaust gas valve of the engine according to the operation status of the engine, and an intake air throttle valve provided in the intake air passage to control the opening of the intake air passage; deposit detecting means for detecting the deposit of particulates deposited on the filtering means; and a controller for controlling the selected one apparatus based on the detection output of the deposit detecting means.

In the filtering means regenerating system according to the first aspect of the invention, if the deposit detecting means detects a deposit of particulates larger than a predetermined amount on the filtering means, based on this detection output, the controller controls any one apparatus selected from a group consisting of the variable timer mechanism, the EGR valve, the variable stator blade, the variable valve timing mechanism, and the intake air throttle valve (for example, the variable timer mechanism) according to the operation status of the engine. At the time of low-load operation of the engine, the controller controls the variable timer mechanism to delay the injection timing of fuel as compared with the usual injection timing, so that the temperature of exhaust gas rises to a temperature at which the particulates can be oxidized by $NO_2$ and removed. As a result, after NO in exhaust gas is oxidized into $NO_2$ by the oxidation catalyst, the particulates deposited on the filtering means are rapidly oxidized by the $NO_2$ and removed. On the other hand, at the time of high-load operation of the engine, the controller controls the variable timer mechanism to advance the injection timing of fuel as compared with the usual injection timing, so that the discharge amount of NO in exhaust gas increases. As a result, the amount of $NO_2$ produced by the oxidation of NO using the oxidation catalyst is increased. Therefore, the particulates deposited on the filtering means are rapidly oxidized by this increased $NO_2$ and removed.

In the second aspect of the present invention, a filtering means regenerating system comprises two or three or more apparatuses selected from a group consisting of a variable timer mechanism for an in-line fuel injection system or distributor type fuel injection system, which regulates either one or both of the injection timing and injection amount of fuel injected into an engine, an EGR valve of an EGR system, which controls the flow rate of exhaust gas recirculated from an exhaust gas passage to an intake air passage of the engine, a variable stator blade provided in a turbocharger for supercharging intake air in the intake air passage by means of energy of the exhaust gas to regulate the amount of intake air supercharged into the intake air passage, a variable valve timing mechanism for changing the opening/closing timing and lifts of an intake air valve and exhaust gas valve of the engine according to the operation status of the engine, an intake air throttle valve provided in the intake air passage to control the opening of the intake air passage, and an exhaust gas throttle valve provided in the exhaust gas passage to control the opening of the exhaust gas passage; deposit detecting means for detecting the deposit of particulates deposited on a filtering means; and a controller for controlling the selected two, three, or more apparatuses based on the detection output of the deposit detecting means.

In the filtering means regenerating system according to the second aspect of the invention, if the deposit detecting means detects a deposit of particulates larger than a predetermined amount on the particulate filter, based on this detection output, the controller controls two or three or more apparatuses selected from a group consisting of the variable timer mechanism, the EGR valve, the variable stator blade, the variable valve timing mechanism, the intake air throttle valve, and the exhaust gas throttle valve (for example, the variable timer mechanism, the EGR valve, the intake air throttle valve, and the exhaust gas throttle valve) according to the operation status of the engine. At the time of low-load operation of the engine, the controller controls the variable timer mechanism to delay the injection timing of fuel as compared with the usual injection timing, so that the temperature of exhaust gas is increased. Also, the controller decreases the opening of the EGR valve to decrease the EGR ratio, so that the discharge amount of NO is increased. Further, the controller throttles the intake air throttle valve and the exhaust gas throttle valve to decrease the air-fuel ratio and to increase the exhaust gas resistance, thereby increasing the discharge amount of NO and the temperature of exhaust gas.

On the other hand, at the time of high-load operation of the engine, the controller controls the variable timer mechanism to advance the injection timing of fuel as compared with the usual injection timing, so that the discharge amount of NO in exhaust gas is increased. Also, the controller decreases the opening of the EGR valve to increase the discharge amount of NO as described above, and further throttles the intake air throttle valve and the exhaust gas throttle valve to increase the discharge amount of NO and the temperature of exhaust gas as described above.

In the third aspect of the present invention, a filtering means regenerating system comprises one or two or more apparatuses selected from a group consisting of an accumulator fuel injection system, which regulates either one or both of the injection timing and injection amount of fuel injected into an engine, an EGR valve of an EGR system, which controls the flow rate of exhaust gas recirculated from an exhaust gas passage to an intake air passage of the engine, a variable stator blade provided in a turbocharger for supercharging intake air in the intake air passage by means of energy of the exhaust gas to regulate the amount of intake air supercharged into the intake air passage, a variable valve timing mechanism for changing the opening/closing timing and lifts of an intake air valve and exhaust gas valve of the engine according to the operation status of the engine, an intake air throttle valve provided in the intake air passage to control the opening of the intake air passage, and an exhaust gas throttle valve provided in the exhaust gas passage to control the opening of the exhaust gas passage; deposit detecting means for detecting the deposit of particulates deposited on a filtering means; and a controller for controlling the selected one, two, or more apparatuses based on the detection output of the deposit detecting means.

In the filtering means regenerating system according to the third aspect of the invention, if the deposit detecting means detects a deposit of particulates larger than a predetermined amount on the filtering means, based on this detection output, the controller controls one or two or more apparatuses selected from a group consisting of the accumulator fuel injection system, the EGR valve, the variable stator blade, the variable valve timing mechanism, the intake air throttle valve, and the exhaust gas throttle valve (for example, the accumulator fuel injection system) according to the operation status of the engine. At the time of low-load operation of the engine, the controller controls the accumulator fuel injection system to delay the injection timing of fuel as compared with the usual injection timing and to increase the injection amount of post-injection, so that the temperature of exhaust gas rises to a temperature at which the particulates can be oxidized by $NO_2$ and removed. As a result, after NO in exhaust gas is oxidized into $NO_2$ by the oxidation catalyst, the particulates deposited on the filtering means are rapidly oxidized by the $NO_2$ and removed. On the other hand, at the time of high-load operation of the engine, the controller controls the accumulator fuel injection system to advance the injection timing of fuel as compared with the usual injection timing, so that the discharge amount of NO in exhaust gas increases. As a result, the amount of $NO_2$ produced by the oxidation of NO using the oxidation catalyst is increased. Therefore, the particulates deposited on the filtering means are rapidly oxidized by this increased $NO_2$ and removed.

Preferably, the aforementioned deposit detecting means is configured by one or two or more sensors selected from a group consisting of an exhaust gas pressure sensor for detecting the pressure of exhaust gas, an engine rotation sensor for detecting the rotational speed of the engine, an engine load sensor for detecting the load of the engine, an engine operation timer for detecting the operation time of the engine, an intake air amount sensor for detecting the amount of intake air of the engine, an NOx sensor for detecting the concentration of NOx in exhaust gas, an $O_2$ sensor for detecting the concentration of oxygen contained in the exhaust gas, and an exhaust gas temperature sensor for detecting the temperature of the exhaust gas.

DETAILED DESCRIPTION OF THE PREFERRED EMBODIMENTS

Figure 1:
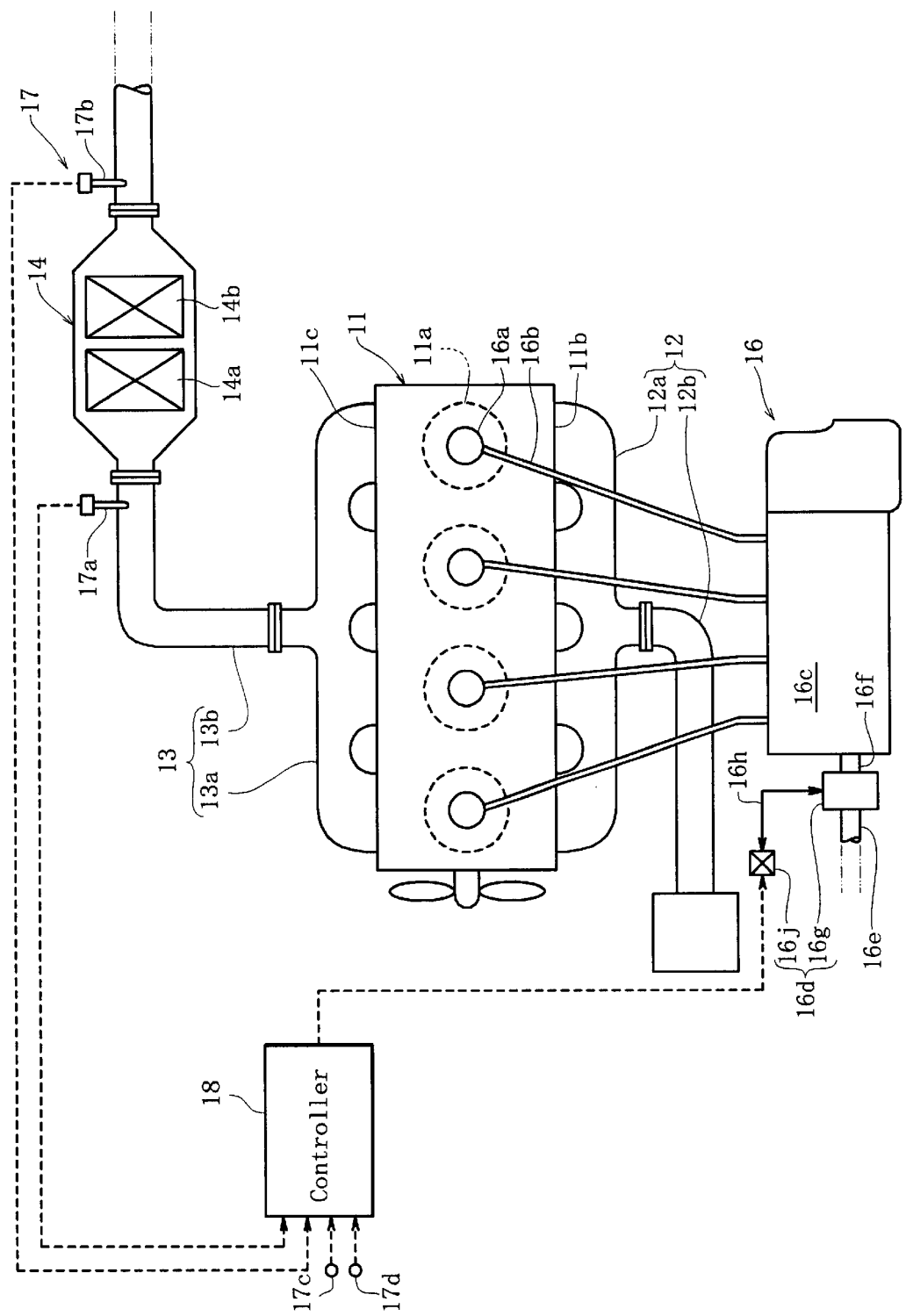
FIG. 1 is a schematic view of a filtering means regenerating system for a diesel engine in accordance with a first embodiment of the present invention.

A first embodiment of the present invention will now be described with reference to the accompanying drawings. The first embodiment corresponds to claim 1.

An intake port 11b of a cylinder 11a of a diesel engine 11 mounted on a vehicle is connected with an intake air passage 12 or an intake pipe 12b via an intake manifold 12a. An exhaust port 11c of the cylinder 11a is connected with an exhaust gas passage 13 or an exhaust pipe 13b via an exhaust manifold 13a. The exhaust pipe 13b is provided with a case 14, which contains a filtering means. The filtering means in this embodiment comprises an oxidation catalyst 14a and a particulate filter 14b in that order from the exhaust gas upstream side. The oxidation catalyst 14a is installed independently of the particulate filter 14b in the case 14. In this embodiment, the oxidation catalyst 14a is a monolithic catalyst, formed by an aluminum honeycomb carrier on which platinum is supported. Also, in this embodiment, the filter 14b is a honeycomb filter. Although not shown in the figure, the filter 14b has a circular cross section partitioned by porous partitions made of cordierite, which allows exhaust gas to pass through and does not allow particulates to pass through. Adjacent inlet and outlet portions of many through holes formed in parallel with each other are substantially sealed alternately by these partitions. The filter 14b is configured so as to collect particulates contained in engine exhaust gas when engine exhaust gas introduced from the inlet side of the filter 14b is discharged from the outlet side thereof. Also, the oxidation catalyst 14a has a function of oxidizing NO in exhaust gas into $NO_2$, and the filter 14b has not only a function of collecting particulates in exhaust gas but also a function of oxidizing particulates by means of $NO_2$ and removing them at a temperature (above 250 to 300° C.) higher than a predetermined exhaust gas temperature.

On the other hand, the engine 11 is provided with an in-line fuel injection system 16 for injecting fuel into each cylinder 11a. The fuel injection system 16 has fuel injection nozzles 16a provided in the cylinders 11a of the engine 11, a fuel injection pump 16c for pressure-feeding fuel to the nozzles 16a via fuel pressure-feed pipes 16b, and a variable timer mechanism 16d for regulating either one or both of the injection timing and injection amount of fuel. The variable timer mechanism 16d includes an eccentric cam type timer actuator 16g which rotatably holds a drive shaft 16e on the side of the engine 11 and a cam shaft 16f for pump projecting from the fuel injection pump 16c so as to be capable of regulating the phase of the drive shaft 16e and the cam shaft 16f for pump, and an electromagnetic valve 16i for timer connected to the timer actuator 16g via a hydraulic oil pipe 16h. Although not shown in the figure, the timer actuator 16g incorporates an eccentric cam fixed to the drive shaft 16e, a shifter which is connected to the eccentric cam via a shifter pin so as to be capable of moving in the radial direction, and a hydraulic piston capable of being moved in the axial direction by oil pressure. For this variable timer mechanism 16d, the oil pressure acting on the hydraulic piston in the timer actuator 16g is regulated by causing a predetermined electric current to flow in a solenoid of the electromagnetic valve 16i for timer, and the shifter is moved in the radial direction by the axial movement of the hydraulic piston. The movement of the shifter is transmitted to the eccentric cam via the shifter pin. By the rotation of the eccentric cam through a predetermined angle, the phase of the drive shaft 16e and the cam shaft 16f for pump is changed.

The deposit of particulates on the filter 14b is detected by deposit detecting means 17. The deposit detecting means 17 is made up of exhaust gas pressure sensors 17a and 17b for detecting the pressure of exhaust gas, an engine rotation sensor 17c for detecting the rotational speed of the engine, and an engine load sensor 17d for detecting the load of the engine. The exhaust gas pressure sensors 17a and 17b are inserted into the exhaust pipe 13b in front and in rear of the case 14 to detect a pressure difference between the front and rear of the filter 14b. The detection outputs of the exhaust gas pressure sensors 17a and 17b, the engine rotation sensor 17c, and the engine load sensor 17d are connected to the control inputs of a controller 18, and the control output of the controller 18 is connected to the electromagnetic valve 16i for timer. Also, the controller 18 is provided with a memory (not shown). The memory stores a predetermined pressure difference between the front and rear of the filter 14b according to the rotational speed and load of the engine 11 as a map. If the pressure difference of the aforementioned paired exhaust gas pressure sensors 17a and 17b increases to the aforementioned predetermined pressure difference, it is judged that the deposit of particulates on the filter 14b has reached a predetermined amount, and the regeneration time for the filter 14b has come.

The following is a description of the operation of the filtering means regenerating system for a diesel engine configured as described above.

When the engine 11 is started, the controller 18 calculates the deposit of particulates on the filter 14b based on the detection outputs of the exhaust gas pressure sensors 17a and 17b, the engine rotation sensor 17c, and the engine load sensor 17d. If the pressure difference between the front and rear of the filter 14b according to the rotational speed and load of the engine 11 exceeds the predetermined pressure difference stored in the memory, the controller 18 judges that the deposit of particulates on the filter 14b has reached the predetermined amount. At the time of light-load operation of the engine 11, the controller 18 controls the electromagnetic valve 16i for timer to delay the injection timing of fuel as compared with the usual injection timing. As a result, the exhaust gas temperature rises to a temperature at which the particulates can be oxidized by $NO_2$ and removed (the exhaust gas temperature rises by 50° C. and more). Therefore, after NO in exhaust gas is oxidized into $NO_2$ by the oxidation catalyst 14a, the particulates deposited on the filter 14b are rapidly oxidized by the $NO_2$ and removed as expressed by Equation (1).

$$C+NO_2 \rightarrow CO_2+N_2 \qquad (1)$$

In Equation (1), C (carbon) is a principal ingredient of particulates collected by the filter 14b.

On the other hand, at the time of high-load operation of the engine 11, the controller 18 controls the electromagnetic valve 16i for timer to advance the injection timing of fuel as compared with the usual injection timing. As a result, the discharge amount of NO in exhaust gas increases (the discharge amount of NO increases by 30% and more), so that the amount of $NO_2$ produced by the oxidation of NO using the oxidation catalyst 14a is increased. Therefore, the particulates deposited on the filter 14b are rapidly oxidized by this increased $NO_2$ and removed. Thereupon, by the control of the electromagnetic valve 16i for timer of the variable timer mechanism 16d carried out by the controller 18 according the operation status of the engine 11, the filter 14b can be prevented from becoming in an excessively collecting state in all operation statuses of the engine 11.

Figure 2:
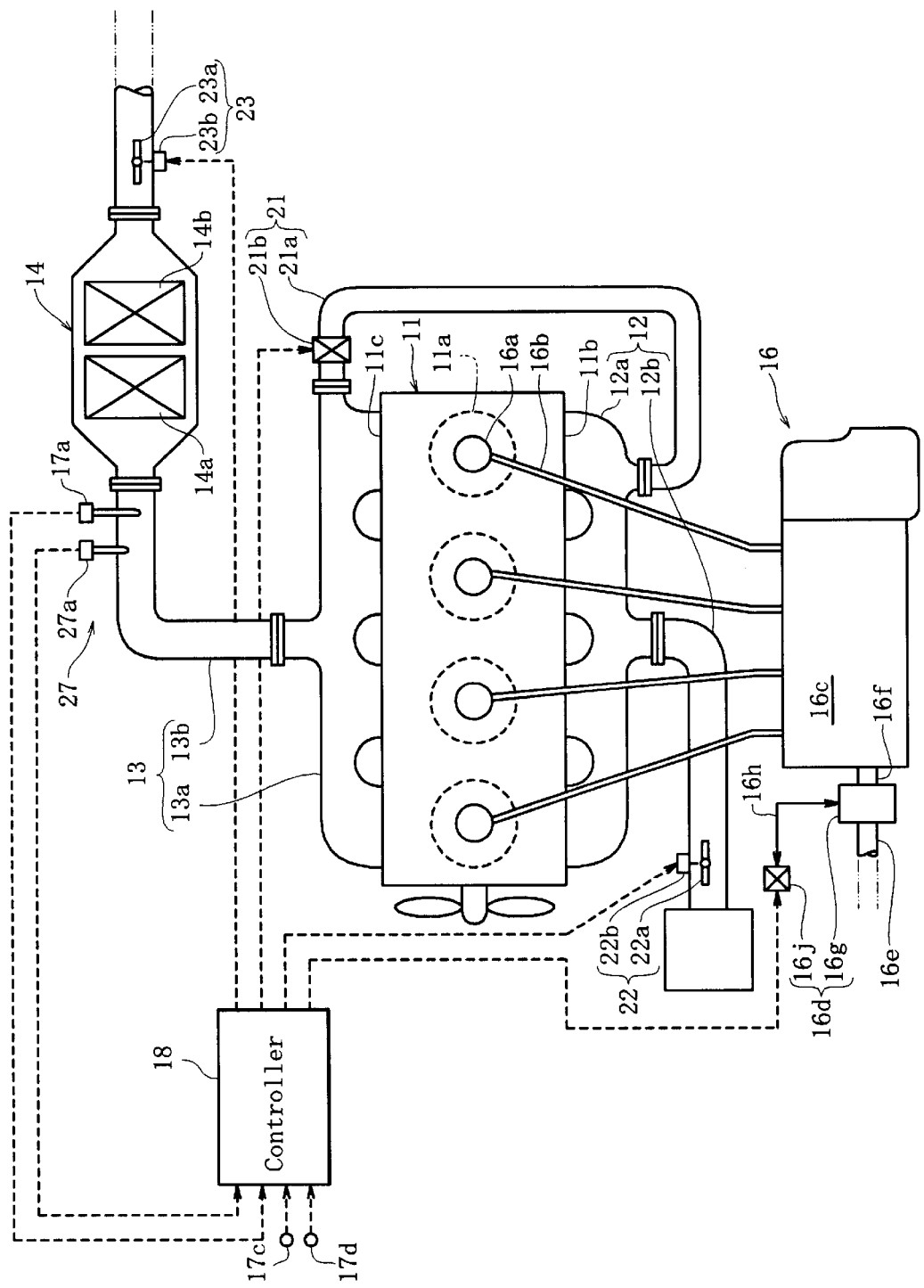
FIG. 2 is a schematic view showing a second embodiment of the present invention, which corresponds to FIG. 1.

FIG. 2 shows a second embodiment of the present invention. This embodiment corresponds to claim 6. In FIG. 2, the same reference numeral as that in FIG. 1 denotes the same element.

In this embodiment, in addition to the variable timer mechanism 16d in the first embodiment, there are provided a high-pressure recirculation type EGR system 21 for recirculating some of exhaust gas in the exhaust manifold 13a to the intake manifold 12a, an intake air throttle valve 22 capable of controlling the flow rate of intake air flowing in the intake pipe 12b, and an exhaust gas throttle valve 23 capable of controlling the flow rate of exhaust gas flowing in the exhaust pipe 13b. The EGR system 21 includes an EGR pipe 21a one end of which is connected to the exhaust manifold 13a and the other end of which is connected to the intake manifold 12a by bypassing the engine 11, and an EGR valve 21b which is provided in the EGR pipe 21a so as to be capable of controlling the flow rate of exhaust gas recirculated from the exhaust manifold 13a to the intake manifold 12a through the EGR pipe 21a. Although not shown in the figure, the EGR valve 21b is a motor operated valve for controlling the opening of a valve body by driving a valve element by using a motor. For the EGR valve, an air operated valve etc. may be used in place of the motor operated valve. Also, the EGR pipe may be provided with an EGR cooler for cooling the exhaust gas (EGR gas) recirculated to the intake manifold.

The intake air throttle valve 22, having an intake-side valve body 22a provided in the intake pipe 12b and an intake-side drive motor 22b for driving the valve body 22a, is configured so as to be capable of controlling the opening of the intake pipe 12b continuously or in a plurality of stages from the fully opened state to the fully closed state. The exhaust gas throttle valve 23, having an exhaust-side valve body 23a provided in the exhaust pipe 13b on the exhaust gas downstream side of the case 14 and an exhaust-side drive motor 23b for driving the valve body 23a, is configured so as to be capable of controlling the opening of the exhaust pipe 13b continuously or in a plurality of stages from the fully opened state to the fully closed state. On the other hand, deposit detecting means 27 is made up of the exhaust gas pressure sensor 17a for detecting the pressure of exhaust gas, the engine rotation sensor 17c for detecting the rotational speed of the engine, the engine load sensor 17d for detecting the load of the engine, and an exhaust gas temperature sensor 27a for detecting the temperature of exhaust gas. The exhaust gas pressure sensor 17a and the exhaust gas temperature sensor 27a are inserted in the exhaust pipe 13b on the exhaust gas upstream side of the case 14. The detection outputs of the exhaust gas pressure sensor 17a, the engine rotation sensor 17c, the engine load sensor 17d, and the exhaust gas temperature sensor 27a are connected to the control inputs of the controller 18, and the control outputs of the controller 18 are connected to the electromagnetic valve 16i for timer, the EGR valve 21b, the intake-side drive motor 22b, and the exhaust-side drive motor 23b. The system of the second embodiment is configured in the same manner as the first embodiment excluding the above-described configuration.

In the filtering means regenerating system configured as described above, since the deposit detecting means 27 has the exhaust gas temperature sensor 27a in addition to the exhaust gas pressure sensor 17a, the engine rotation sensor 17c, and the engine load sensor 17d, the controller 18 can determine the deposit of particulates on the filter 14b more accurately than the case of the first embodiment. The controller 18 calculates the deposit of particulates on the filter 14b based on the detection outputs of the exhaust gas pressure sensor 17a, the engine rotation sensor 17c, the engine load sensor 17d, and the exhaust gas temperature sensor 27a. If the controller 18 judges that the deposit of particulates on the filter 14b has reached a predetermined amount, at the light-load operation of the engine 11, the controller 18 controls the electromagnetic valve 16i for timer to delay the injection timing of fuel as compared with the usual injection timing, decreases the opening of the EGR valve 21b, and further throttles the intake air throttle valve 22 and the exhaust gas throttle valve 23.

If the injection timing of fuel is delayed as compared with the usual injection timing, the temperature of exhaust gas rises (the temperature of exhaust gas rises by 50° C. and more). If the opening of the EGR valve 21b is decreased, the EGR ratio decreases and the discharge amount of NO increases (the discharge amount of NO increases by 30% and more). Further, if the intake air throttle valve 22 and the exhaust gas throttle valve 23 are throttled, the air-fuel ratio decreases and the exhaust gas resistance increases, so that the discharge amount of NO increases (the discharge amount of NO increases by 20% and more) and the temperature of exhaust gas rises (the temperature of exhaust gas rises by 50° C. and more). As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve 16i for timer to advance the injection timing of fuel as compared with the usual injection timing, decreases the opening of EGR valve 21b, and further throttles the intake air throttle valve 22 and the exhaust gas throttle valve 23. If the injection timing of fuel is advanced as compared with the usual injection timing, the discharge amount of NO in exhaust gas increases (the discharge amount of NO increases by 30% and more). If the opening of the EGR valve 21b is decreased, the discharge amount of NO increases as described above. Further, if the intake air throttle valve 22 and the exhaust gas throttle valve 23 are throttled, the temperature of exhaust gas rises and the discharge amount of NO increases as described above. As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed. Thereupon, as in the case of the first embodiment, the filter 14b can be prevented from becoming in an excessively collecting state in all operation statuses of the engine 11.

Figure 3:
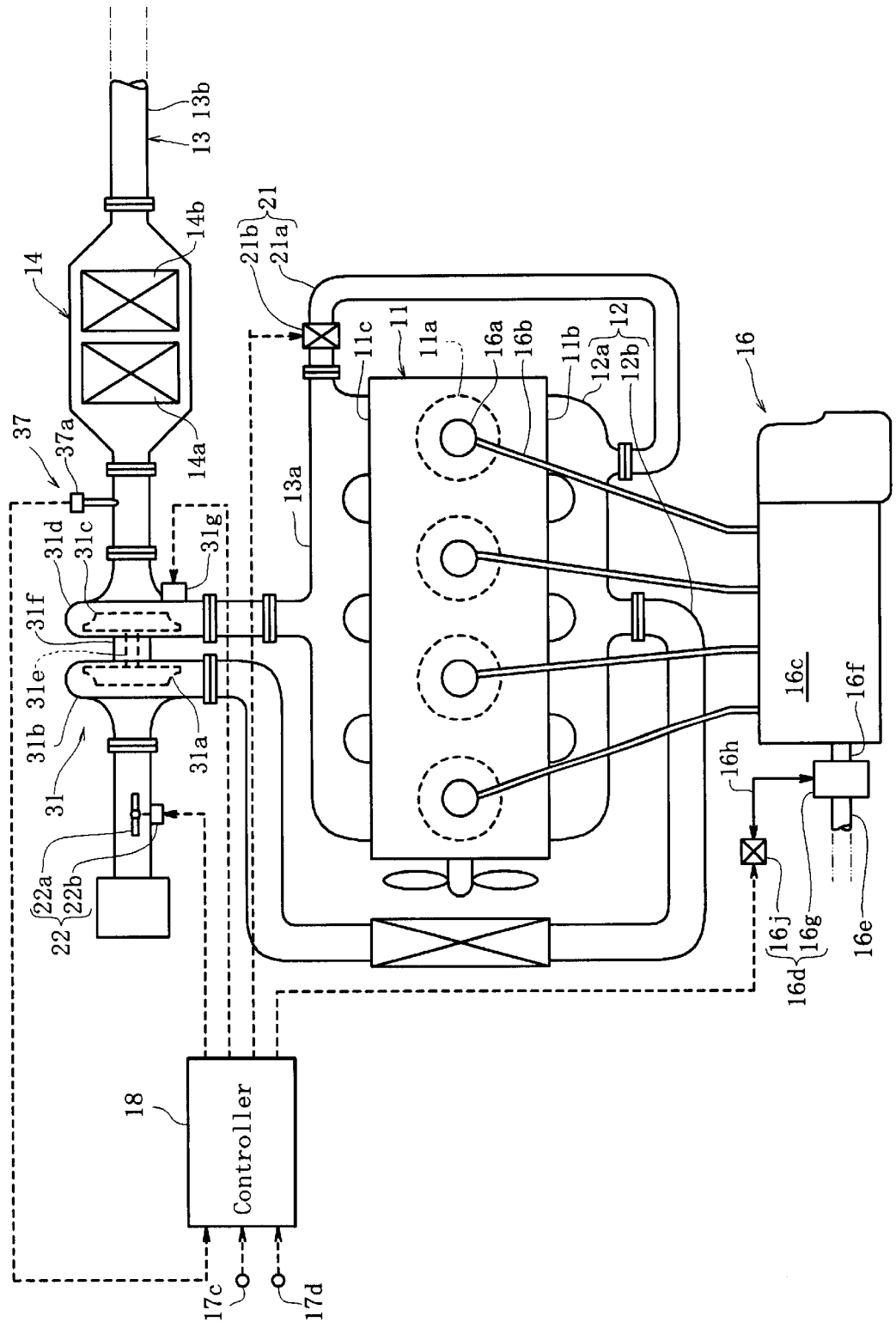
FIG. 3 is a schematic view showing a third embodiment of the present invention, which corresponds to FIG. 1.

FIG. 3 shows a third embodiment of the present invention. This embodiment corresponds to claim 6. In FIG. 3, the same reference numeral as that in FIGS. 1 and 2 denotes the same element.

In this embodiment, there are provided the variable timer mechanism 16i in the first embodiment, the EGR system 21 in the second embodiment, a turbocharger 31 for supercharging intake air in the intake pipe 12b by means of the energy of exhaust gas, and the intake air throttle valve 22 in the second embodiment. The turbocharger 31 includes a compressor housing 31b which is provided in the intake pipe 12b and rotatably contains a compressor wheel 31a, and a turbine housing 31d which is provided in the exhaust pipe 13b and rotatably contains a turbine wheel 31c. The turbine housing 31d and the compressor housing 31b are connected to each other by a connecting portion 31f for rotatably holding the center of a shaft 31e, and the turbine wheel 31c and the compressor wheel 31a are fitted at each end of the shaft 31e. The turbine housing 31d is rotatably fitted with a plurality of movable stator blades (not shown), and the compressor housing 31b is nonrotatably fitted with a plurality of fixed stator blades (not shown). The movable stator blades are configured so as to be capable of being rotated by a turbo back pressure actuator 31g such as an electric motor.

On the other hand, deposit detecting means 37 is made up of the engine rotation sensor 17c for detecting the rotational speed of the engine 11, the engine load sensor 17d for detecting the load of the engine, and an NOx sensor 37a for detecting the concentration of NOx in exhaust gas. The NOx sensor 37a is inserted in the exhaust pipe 13b on the exhaust gas upstream side of the case 14. The detection outputs of the engine rotation sensor 17c, the engine load sensor 17d, and the NOx sensor 37a are connected to the control inputs of the controller 18, and the control outputs of the controller 18 are connected to the electromagnetic valve 16i for timer, the turbo back pressure actuator 31g, the EGR valve 21b, and the intake-side drive motor 22b. Also, a memory provided in the controller 18 stores a predetermined concentration of NOx (on the exhaust gas downstream side of the case 14) according to the rotational speed and load of the engine 11 as a map. If the deposit of particulates on the filter 14b exceeds a predetermined amount, the pressure of exhaust gas on the upstream side of the filter 14b increases, and the EGR ratio decreases. Thereupon, the NOx concentration detected by the NOx sensor 37a exceeds the aforementioned predetermined NOx concentration, so that it is judged that the regeneration time for the filter 14b has come. The system of the third embodiment is configured in the same manner as the first embodiment excluding the above-described configuration.

In the filtering means regenerating system configured as described above, the controller 18 calculates the deposit of particulates on the filter 14b based on the detection outputs of the engine rotation sensor 17c, the engine load sensor 17d, and the NOx sensor 37a. If the controller 18 judges that the deposit of particulates on the filter 14b has reached a predetermined amount, at the light-load operation of the engine 11, the controller 18 controls the electromagnetic valve 16i for timer to delay the injection timing of fuel as compared with the usual injection timing, decreases the opening of the EGR valve 21b, controls the turbo back pressure actuator 31g to throttle the movable stator blades more than usual, and further throttles the intake air throttle valve 22. If the injection timing of fuel is delayed as compared with the usual injection timing, the temperature of exhaust gas rises (the temperature of exhaust gas rises by 50° C. and more). If the opening of the EGR valve 21b is decreased, the EGR ratio decreases and the discharge amount of NO increases (the discharge amount of exhaust gas increases by 30% and more). If the movable stator blades are throttled more than usual, the pressure of exhaust gas increases, so that the temperature of exhaust gas rises (the temperature of exhaust gas rises by 30° C. and more), and the discharge amount of NO increases (the discharge amount of NO increases by 30% and more). Further, if the intake air throttle valve 22 is throttled, the air-fuel ratio decreases and the intake air resistance increases, so that the discharge amount of NO increases (the discharge amount of NO increases by 20% and more) and the temperature of exhaust gas rises (by 50° C. and more). As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve 16i for timer to advance the injection timing of fuel as compared with the usual injection timing, decreases the opening of the EGR valve 21b, controls the turbo back pressure actuator 31g to throttle the movable stator blades more than usual, and further throttles the intake air throttle valve 22. If the injection timing of fuel is advanced as compared with the usual injection timing, the discharge amount of NO in exhaust gas increases (the discharge amount of NO increases by 30% and more). If the opening of the EGR valve 21b is decreased, the discharge amount of NO increases as described above. If the movable stator blades are throttled more than usual, the temperature of exhaust gas increases and the discharge amount of NO increases as described above. Further, if the intake air throttle valve 22 is throttled, the discharge amount of NO increases and the temperature of exhaust gas rises as described above. As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed. Thereupon, as in the case of the first embodiment, the filter 14b can be prevented from becoming in an excessively collecting state in all operation statuses of the engine 11.

Figure 4:
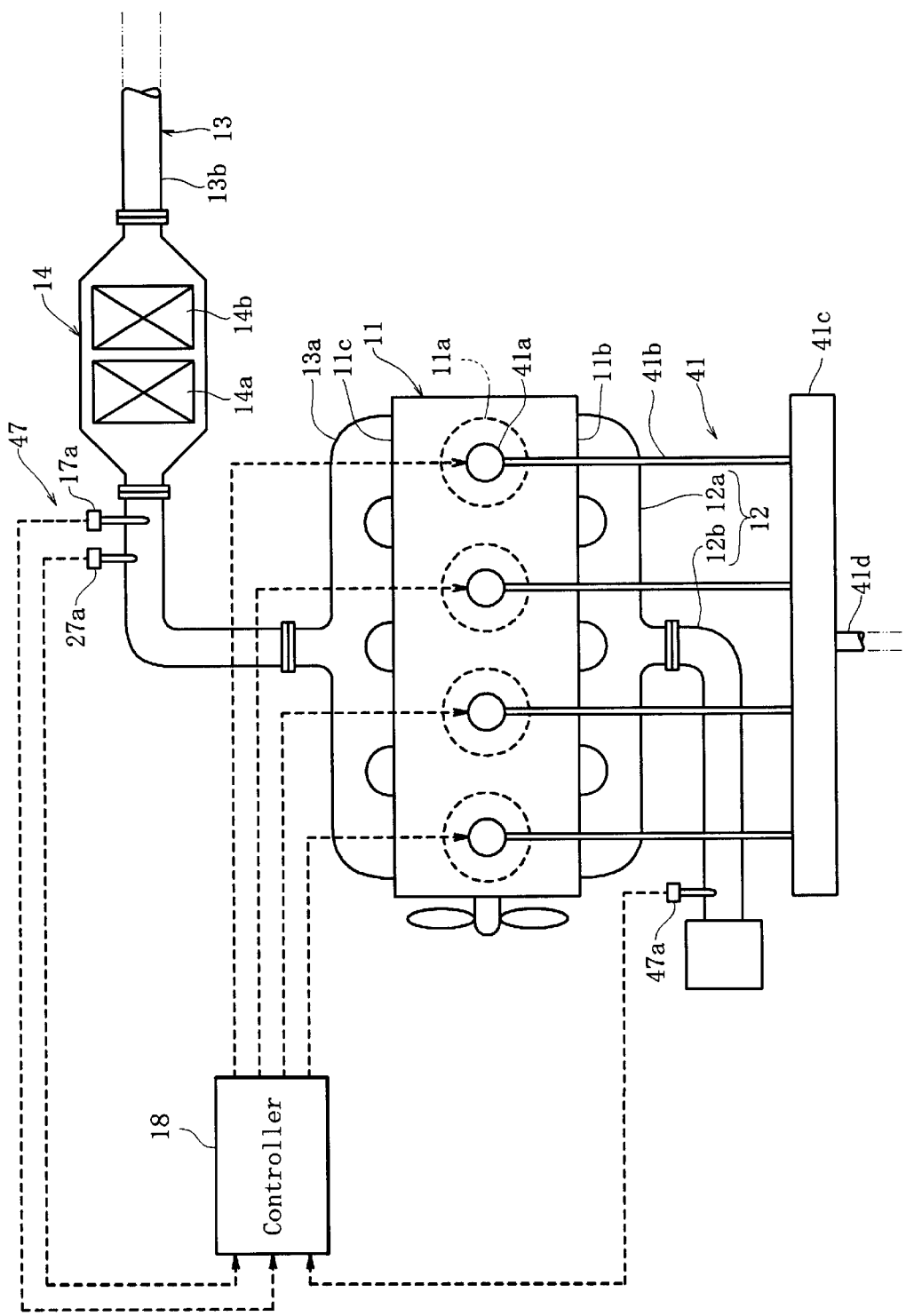
FIG. 4 is a schematic view showing a fourth embodiment of the present invention, which corresponds to FIG. 1.

FIG. 4 shows a fourth embodiment of the present invention. This embodiment corresponds to claim 11. In FIG. 4, the same reference numeral as that in FIG. 1 denotes the same element.

In this embodiment, an accumulator fuel injection system 41 is provided in place of the in-line fuel injection system in the first embodiment. The accumulator fuel injection system 41 has an electronically controlled injectors 41a provided in the cylinders 11a of the engine 11, a common rail 41c connected to the injectors 41a via fuel pressure-feed pipes 41b, and a supply pump (not shown) connected to the common rail 41c via a supply pipe 41d. Although not shown in the figure, the injector 41a is made up of an injection nozzle facing the cylinder 11a, a needle valve capable of opening/closing an injection hole of the injection nozzle, and an electromagnetic valve for injector which vertically moves the needle valve via a composite piston and a one-way orifice plate. When the electromagnetic valve for injector is in an off state, the injection hole of the injection nozzle is closed, and when it is turned on, the injection hole is opened so that fuel is injected into the cylinder 11a.

On the other hand, deposit detecting means 47 is made up of the exhaust gas pressure sensor 17a for detecting the pressure of exhaust gas, an intake air amount sensor 47a for detecting the amount of intake air of the engine 11, and the exhaust gas temperature sensor 27a for detecting the temperature of exhaust gas. The exhaust gas pressure sensor 17a and the exhaust gas temperature sensor 27a are inserted in the exhaust pipe 13b on the exhaust gas upstream side of the case 14. The detection outputs of the exhaust gas pressure sensor 17a, the intake air amount sensor 47a, and the exhaust gas temperature sensor 27a are connected to the control inputs of the controller 18, and the control outputs of the controller 18 are connected to electromagnetic valves for the injector 41a. Also, the controller 18 is provided with a memory (not shown). The volume of exhaust gas passing through the filter 14b is calculated from the exhaust gas temperature and the intake air amount, and the deposit of particulates on the filter 14b is calculated from the aforementioned exhaust gas volume and the exhaust gas pressure just before the filter 14b. Therefore, if the deposit of particulates exceeds a predetermined amount stored in the memory, it is judged that the regeneration time for the filter 14b has come. The system of the fourth embodiment is configured in the same manner as the first embodiment excluding the above-described configuration.

In the filtering means regenerating system configured as described above, the controller 18 calculates the deposit of particulates on the filter 14b based on the detection outputs of the exhaust gas pressure sensor 17a, the intake air amount sensor 47a, and the exhaust gas temperature sensor 27a. If the controller 18 judges that the deposit of particulates on the filter 14b has reached the predetermined amount, at the light-load operation of the engine 11, the controller 18 controls the electromagnetic valve for the injector 41a to delay the main injection timing of fuel as compared with the usual injection timing and to increase the injection amount of post-injection. Therefore, the exhaust gas temperature rises to a temperature at which the particulates can be oxidized by $NO_2$ and removed (the exhaust gas temperature rises by 100° C. and more). Also, since not only the exhaust gas temperature is increased by the post-injection but also HC is supplied to the oxidation catalyst 14a, this HC can increase the filter temperature by being burned by the oxidation catalyst 14a (the exhaust gas temperature rises by 100° C. and more). As a result, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve for the injector 41a to advance the main injection timing as compared with the usual injection timing, so that the discharge amount of NO in exhaust gas increases (the discharge amount of NO increases by 30% and more). As a result, the amount of $NO_2$ produced by the oxidation of NO using the oxidation catalyst 14a is increased, and the particulates deposited on the filter 14b are rapidly oxidized by this increased $NO_2$ and removed. Thereupon, as in the case of the first embodiment, the filter 14b can be prevented from becoming in an excessively collecting state in all operation statuses of the engine 11.

Figure 5:
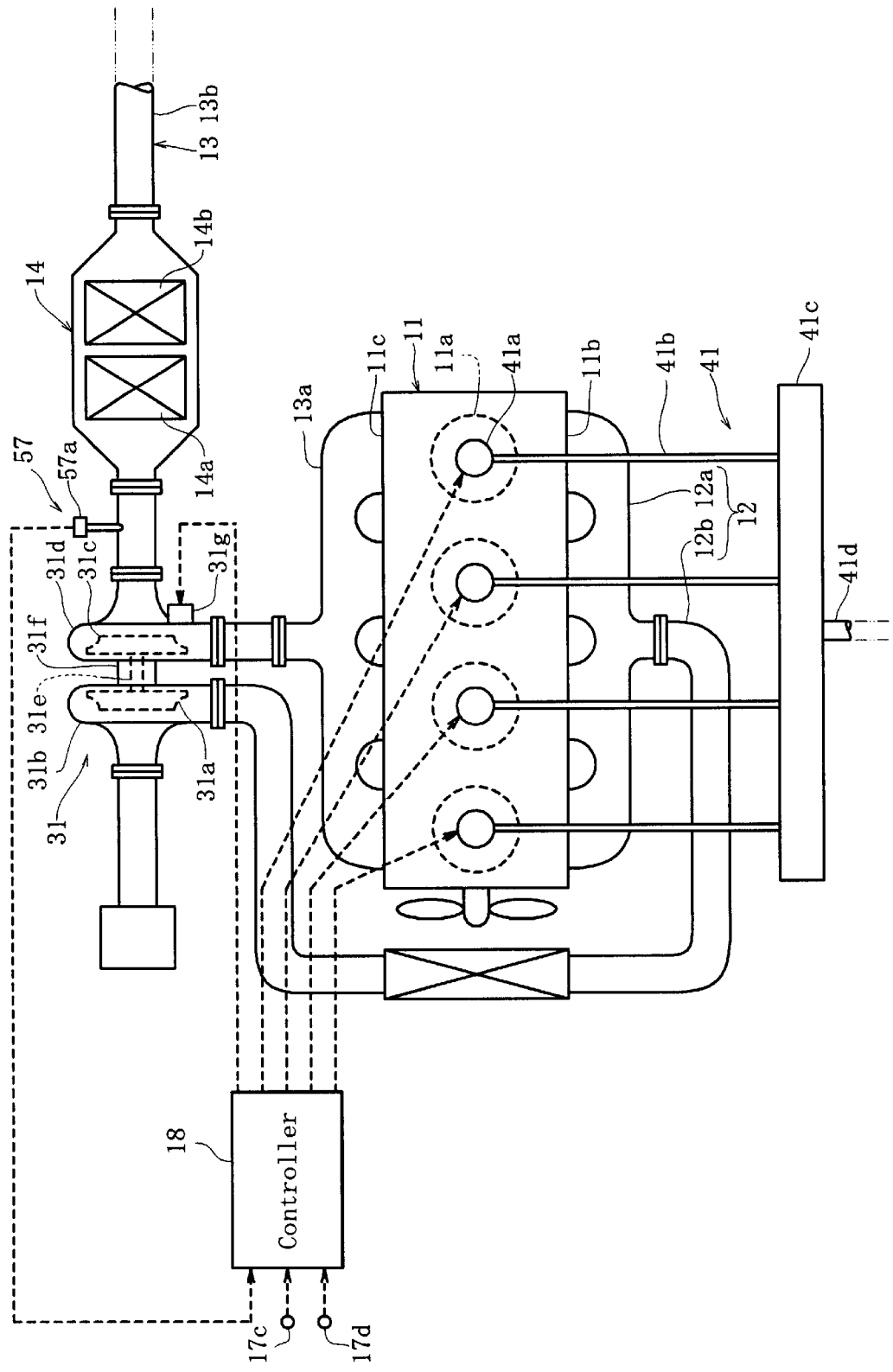
FIG. 5 is a schematic view showing a fifth embodiment of the present invention, which corresponds to FIG. 1.

FIG. 5 shows a fifth embodiment of the present invention. This embodiment corresponds to claim 11. In FIG. 5, the same reference numeral as that in FIGS. 1, 3 and 4 denotes the same element.

In this embodiment, there are provided the accumulator fuel injection system 41 in the fourth embodiment and the turbocharger 31 in the third embodiment. Also, deposit detecting means 57 is made up of the engine rotation sensor 17c for detecting the rotational speed of the engine 11, the engine load sensor 17d for detecting the load of the engine 11, and an $O_2$ sensor 57a for detecting the concentration of oxygen in exhaust gas. The $O_2$ sensor 57a is inserted in the exhaust pipe 13b on the exhaust gas upstream side of the case 14. The detection outputs of the engine rotation sensor 17c, the engine load sensor 17d, and the $O_2$ sensor 57a are connected to the control inputs of the controller 18, and the control outputs of the controller 18 are connected to the electromagnetic valves for the injector 41a and the turbo back pressure actuator 31g. Also, a memory provided in the controller 18 stores a predetermined oxygen concentration (on the exhaust gas downstream side of the case 14) according to the rotational speed and load of the engine 11 as a map. If the deposit of particulates on the filter 14b exceeds a predetermined amount, the temperature of exhaust gas on the upstream side of the filter 14b increases, and the EGR ratio increases. Thereby, the oxygen concentration detected by the $O_2$ sensor 57a is decreased to a value not higher than the aforementioned predetermined oxygen concentration, so that it is judged that the regeneration time for the filter 14b has come. The system of the fifth embodiment is configured in the same manner as the first embodiment excluding the above-described configuration.

In the filtering means regenerating system configured as described above, the controller 18 calculates the deposit of particulates on the filter 14b based on the detection outputs of the engine rotation sensor 17c, the engine load sensor 17d, and the $O_2$ sensor 57. If the controller 18 judges that the deposit of particulates on the filter 14b has reached a predetermined amount, at the time of low-load operation of the engine 11, the controller 18 controls the electromagnetic valve for the injector 41a to delay the main injection timing of fuel as compared with the usual injection timing, increases the injection amount of post-injection, and controls the turbo back pressure actuator 31g to throttle the movable stator blades more than usual. If the main injection timing of fuel is delayed as compared with the usual injection timing, the exhaust gas temperature rises to a temperature at which the particulates can be oxidized by $NO_2$ and removed (the exhaust gas temperature rises by 100° C. and more). If the injection amount of post-injection is increased, HC is burned by the oxidation catalyst 14a, so that the filter temperature rises (the exhaust gas temperature rises by 100° C. and more). As a result, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve for the injector 41a to advance the main injection timing of fuel as compared with the usual injection timing, so that the discharge amount of NO in exhaust gas increases (the discharge amount of NO increases by 30% and more). As a result, the amount of $NO_2$ produced by the oxidation of NO using the oxidation catalyst 14a is increased, and the particulates deposited on the filter 14b are rapidly oxidized by this increased $NO_2$ and removed. Thereupon, as in the case of the first embodiment, the filter 14b can be prevented from becoming in an excessively collecting state in all operation statuses of the engine 11.

Figure 6:
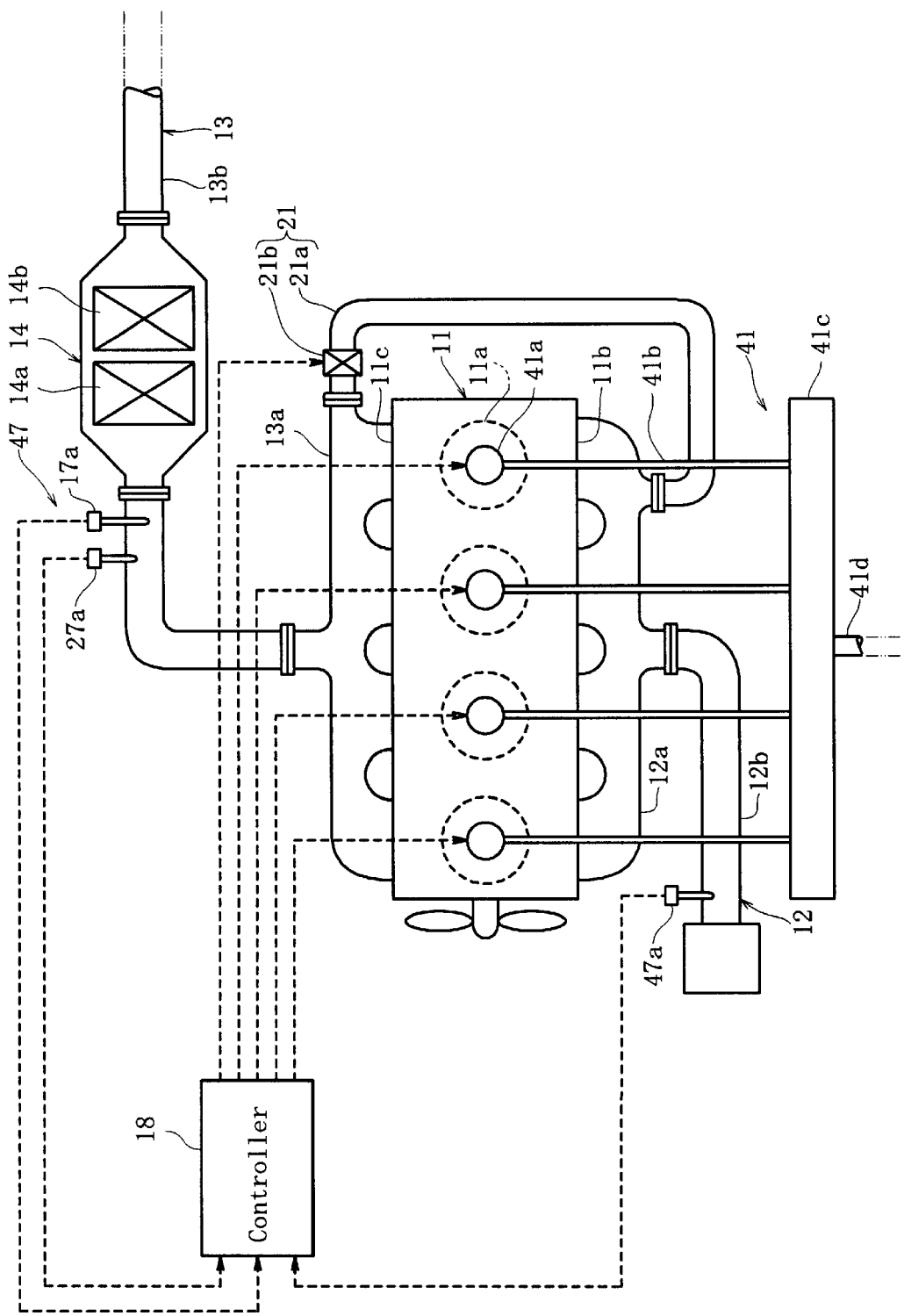
FIG. 6 is a schematic view showing a sixth embodiment of the present invention, which corresponds to FIG. 1.

FIG. 6 shows a sixth embodiment of the present invention. This embodiment corresponds to claim 11. In FIG. 6, the same reference numeral as that in FIGS. 1, 2 and 4 denotes the same element.

In this embodiment, there are provided the accumulator fuel injection system 41 in the fourth embodiment and the EGR system 21 in the second embodiment. The deposit detecting means 47 is made up in the same manner as in the case of the fourth embodiment. Namely, it is made up of the exhaust gas pressure sensor 17a for detecting the pressure of exhaust gas, the intake air amount sensor 47a for detecting the amount of intake air of the engine, and the exhaust gas temperature sensor 27a for detecting the temperature of exhaust gas. The exhaust gas pressure sensor 17a and the exhaust gas temperature sensor 27a are inserted in the exhaust pipe 13b on the exhaust gas upstream side of the case 14. The detection outputs of the exhaust gas pressure sensor 17a, the intake air amount sensor 47a, and the exhaust gas temperature sensor 27a are connected to the control inputs of the controller 18, and the control outputs of the controller 18 are connected to electromagnetic valves for the injector 41a and the EGR valve 21b. The system of the sixth embodiment is configured in the same manner as the first embodiment excluding the above-described configuration.

In the filtering means regenerating system configured as described above, the controller 18 calculates the deposit of particulates on the filter 14b based on the detection outputs of the exhaust gas pressure sensor 17a, the intake air amount sensor 47a, and the exhaust gas temperature sensor 27a. If the controller 18 judges that the deposit of particulates on the filter 14b has reached a predetermined amount, at the light-load operation of the engine 11, the controller 18 controls the electromagnetic valve for the injector 41a to delay the main injection timing of fuel as compared with the usual injection timing, to increase the injection amount of post-injection, and to decrease the opening of the EGR valve 21b. If the main injection timing of fuel is delayed as compared with the usual injection timing, the exhaust gas temperature rises to a temperature at which the particulates can be oxidized by $NO_2$ and removed (the exhaust gas temperature rises by 100° C. and more). If the injection amount of post-injection is increased, HC is burned by the oxidation catalyst 14a, so that the filter temperature rises (the exhaust gas temperature rises by 100° C. and more). If the opening of the EGR valve 21b is decreased, the EGR ratio decreases and the discharge amount of NO increases (the discharge amount of NO increases by 30% and more). As a result, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve for the injector 41a to advance the main injection timing of fuel as compared with the usual injection timing and to decrease the opening of the EGR valve 21b. If the main injection timing is advanced as compared with the usual timing, the discharge amount of NO in exhaust gas increases (the discharge amount of NO increases by 30% and more). If the opening of the EGR valve 21b is decreased, the discharge amount of NO increases as described above (the discharge amount of NO increases by 30% and more). As a result, $NO_2$ produced by the oxidation of NO using the oxidation catalyst 14a is increased, and the particulates deposited on the filter 14b are rapidly oxidized by this increased $NO_2$ and removed. Thereupon, as in the case of the first embodiment, the filter 14b can be prevented from becoming in an excessively collecting state in all operation statuses of the engine 11.

Figure 7:
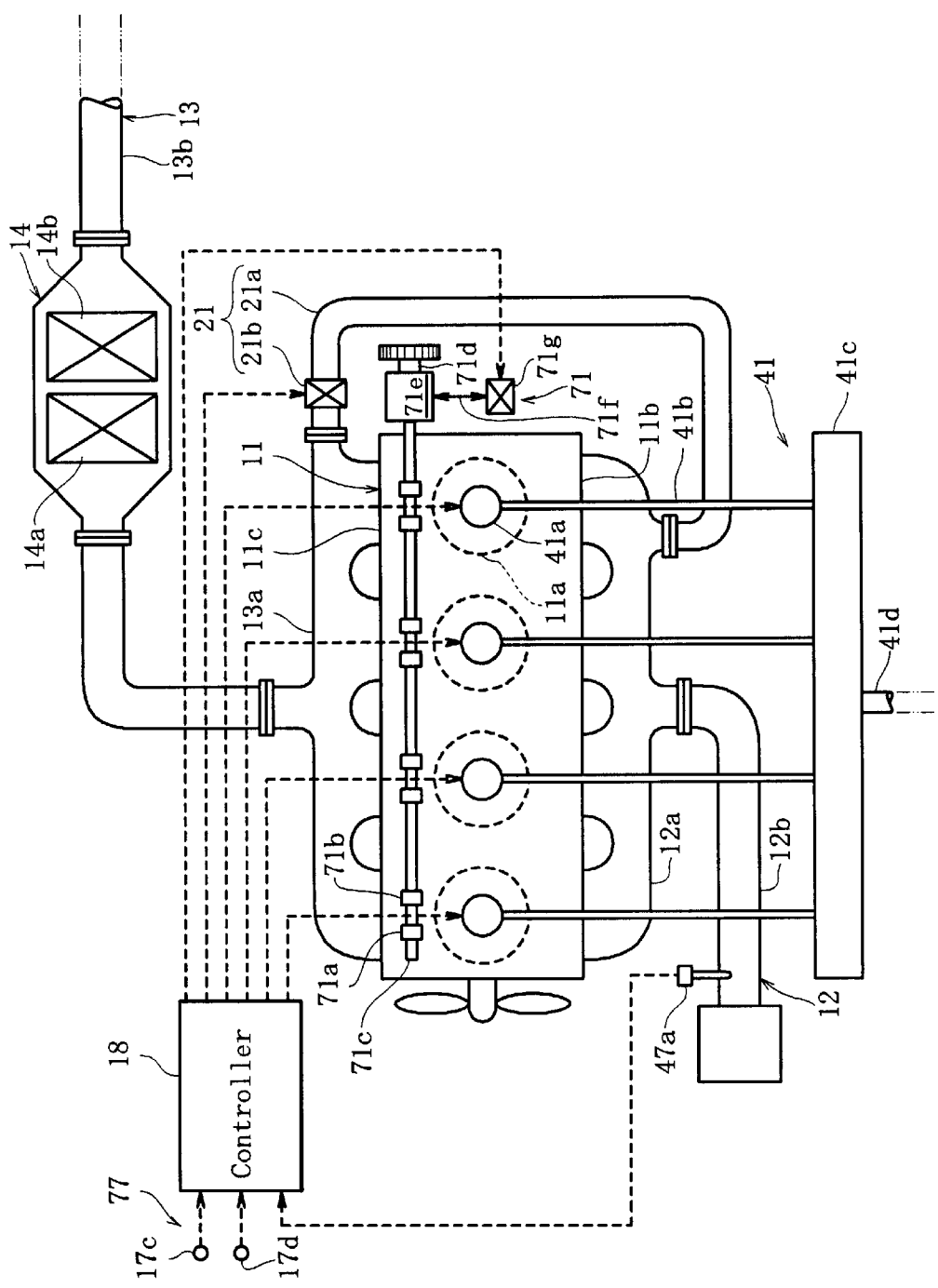
FIG. 7 is a schematic view showing a seventh embodiment of the present invention, which corresponds to FIG. 1.

FIG. 7 shows a seventh embodiment of the present invention. This embodiment corresponds to claim 11. In FIG. 7, the same reference numeral as that in FIGS. 1, 2 and 4 denotes the same element.

In this embodiment, there are provided the accumulator fuel injection system 41 in the fourth embodiment, the EGR system in the second embodiment, and a variable valve timing mechanism 71 for changing the opening/closing timing and lifts of an intake valve and an exhaust valve of the engine 11 according to the operation status of the engine 11. The variable valve timing mechanism 71 includes a helical spline type valve actuator 71e which rotatably holds a camshaft 71c for valve provided with a cam 71a for intake and a cam 71b for exhaust and a drive shaft 71d on the side of the engine 11 so as to be capable of regulating the phase of the camshaft 71c for valve and the drive shaft 71d, and an electromagnetic valve 71g for valve connected to the valve actuator 71e via a hydraulic oil pipe 71f. Although not shown in the figure, the valve actuator 71e incorporates a cylindrical slider interposed between the drive shaft 71d and the camshaft 71c for valve and a hydraulic piston capable of moving the slider in the axial direction. A large-diameter hole is formed in the end face of the drive shaft 71d, and the end portion of the camshaft 71c for valve is inserted with play in this large-diameter hole. The slider is interposed between the large-diameter hole and the end portion of the camshaft 71c. The slider is spline fitted to the large-diameter hole, and is threadedly engaged with the camshaft 71c for valve with a screw having a large lead angle. In this variable valve timing mechanism 71, by causing a predetermined electric current to flow in a solenoid of the electromagnetic valve 71g for valve, the oil pressure acting on the hydraulic piston in the valve actuator 71e is regulated, and the hydraulic piston moves in the axial direction, so that the slider moves in the axial direction. Thereby, the phase of the drive shaft 71d and the camshaft 71c for valve is changed.

On the other hand, deposit detecting means 77 is made up of the engine rotation sensor 17c for detecting the rotational speed of the engine 11, the engine load sensor 17d for detecting the load of the engine 11, and the intake air amount sensor 47a for detecting the amount of intake air of the engine 11. The detection outputs of the engine rotation sensor 17c, the engine load sensor 17d, and the intake air amount sensor 47a are connected to the control inputs of the controller 18, and the control outputs of the controller 18 are connected to the electromagnetic valves for the injector 41a, the EGR valve 21b, and the electromagnetic valve 71g for valve. Also, a memory provided in the controller 18 stores a predetermined intake air amount according to the rotational speed and load of the engine 11 as a map. If the deposit of particulates on the filter 14b exceeds a predetermined amount, the pressure of exhaust gas on the upstream side of the filter 14b increases and the EGR ratio increases, so that the intake air amount detected by the intake air amount sensor 47a decreases to a value smaller than the aforementioned predetermined intake air amount, by which it is judged that the regeneration time for the filter 14b has come. The system of the seventh embodiment is configured in the same manner as the first embodiment excluding the above-described configuration.

In the filtering means regenerating system configured as described above, the controller 18 calculates the deposit of particulates on the filter 14b based on the detection outputs of the engine rotation sensor 17c, the engine load sensor 17d, and the intake air amount sensor 47a. If the controller 18 judges that the deposit of particulates on the filter 14b has reached a predetermined amount, at the light-load operation of the engine 11, the controller 18 controls the electromagnetic valve for the injector 41a to delay the main injection timing of fuel as compared with the usual injection timing and to increase the injection amount of post-injection, and controls the electromagnetic valve 71g for valve to delay (advance) the opening/closing timing of the intake valve and the exhaust valve. If the main injection timing of fuel is delayed as compared with the usual injection timing, the exhaust gas temperature rises to a temperature at which the particulates can be oxidized by $NO_2$ and removed (the exhaust gas temperature rises by 100° C. and more). If the injection amount of post-injection is increased, HC is burned by the oxidation catalyst 14a, so that the filter temperature increases (the exhaust gas temperature rises by 100° C. and more). If the opening/closing timing of the intake valve and the exhaust valve is delayed (advanced), the air-fuel ratio decreases more than usual, the exhaust gas temperature rises (the exhaust gas temperature rises by 50° C. and more), and the discharge amount of NO increases (the discharge amount of NO increases by 20% and more). As a result, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation of the engine 11, the controller 18 controls the electromagnetic valve for the injector 41a to advance the main injection timing of fuel as compared with the usual injection timing, and controls the electromagnetic valve 71g for valve to delay (advance) the opening/closing timing of the intake valve and the exhaust valve. If the main injection timing of fuel is advanced as compared with the usual injection timing, the discharge amount of NO in exhaust gas increases (the discharge amount of NO increases by 30% and more). If the opening/closing timing of the intake valve and the exhaust valve is delayed (advanced), the exhaust gas temperature rises as described above (the exhaust gas temperature rises by 50° C. and more), and the discharge amount of NO increases (the discharge amount of NO increases by 20% and more). As a result, $NO_2$ produced by the oxidation of NO using the oxidation catalyst 14a is increased, and the particulates deposited on the filter 14b are rapidly oxidized by this increased $NO_2$ and removed. Thereupon, as in the case of the first embodiment, the filter 14b can be prevented from becoming in an excessively collecting state in all operation statuses of the engine 11.

Figure 8:
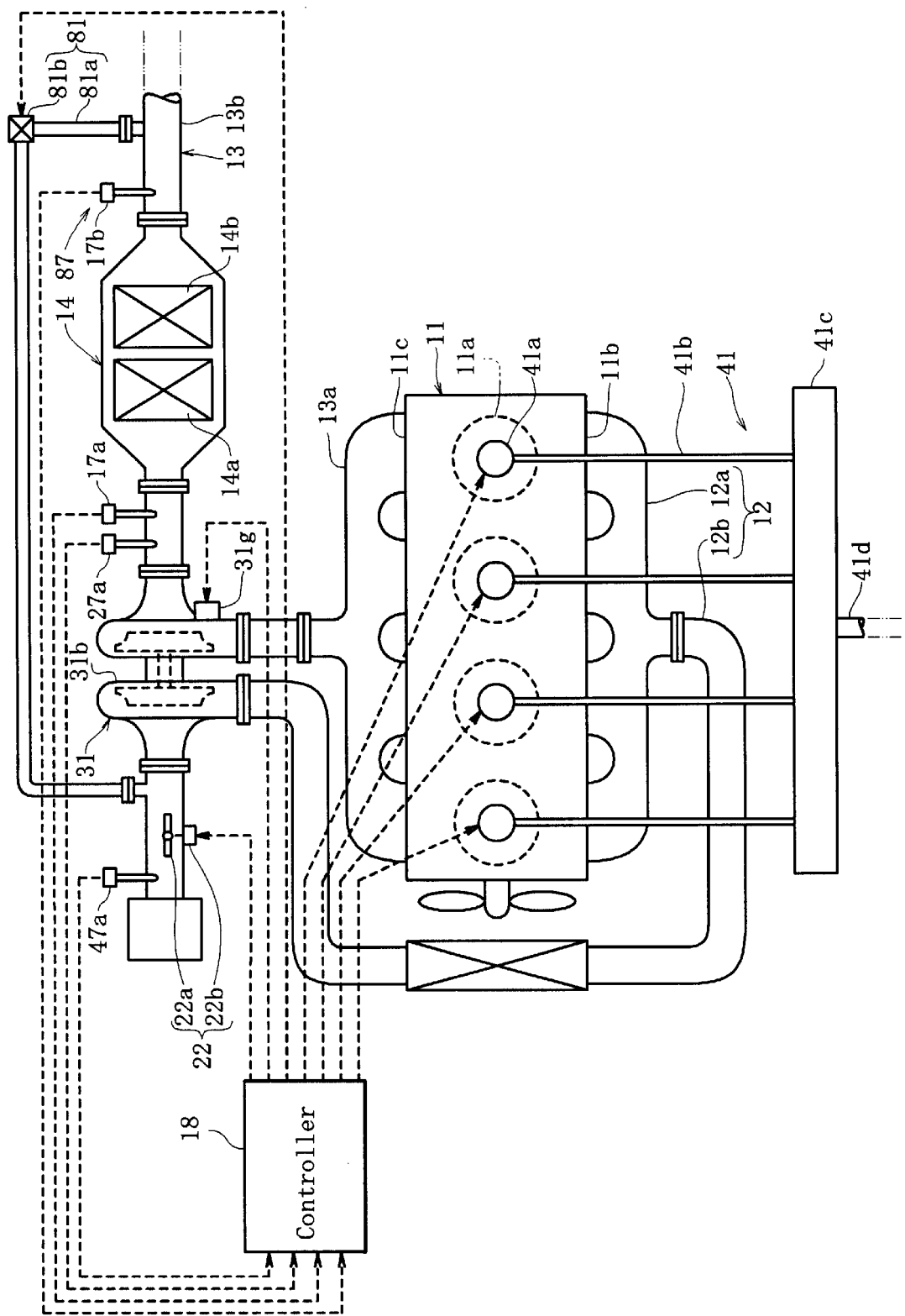
FIG. 8 is a schematic view showing an eighth embodiment of the present invention, which corresponds to FIG. 1.
Figure 9:
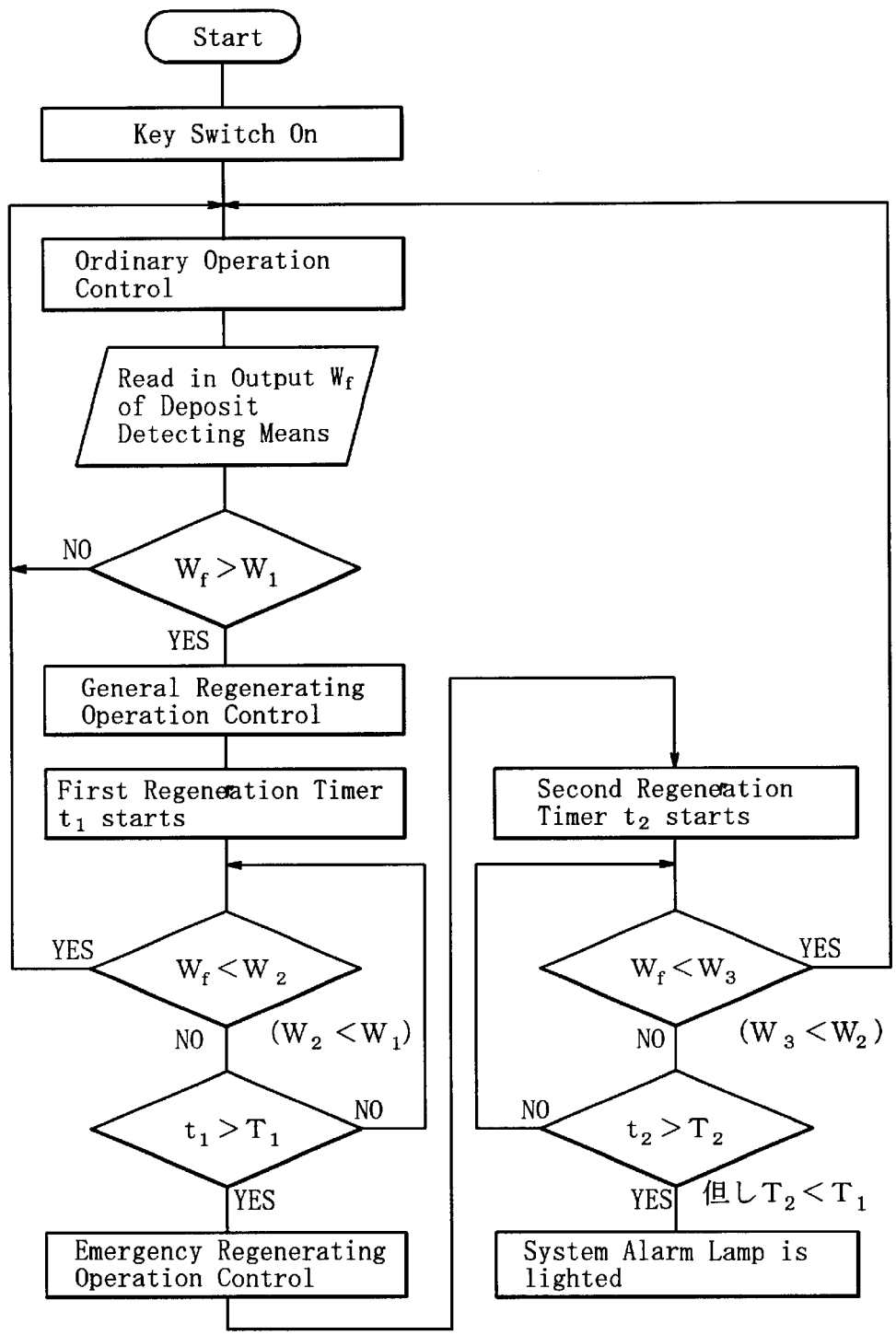
FIG. 9 is a flowchart showing the operation of the filter regenerating system.
Figure 10:
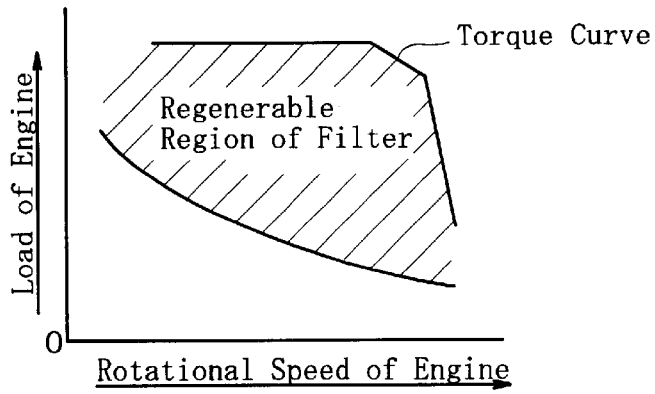
FIG. 10 is charts showing a filter regenerable region changed according to the deposit of particulates on a filter and the filter regeneration efficiency of the filter.
Figure 10:
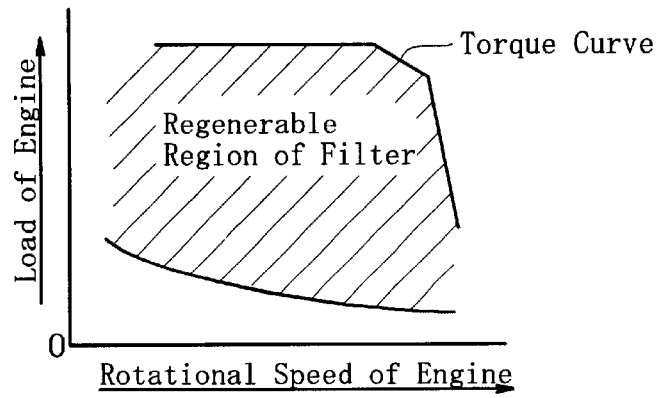
Figure 10:
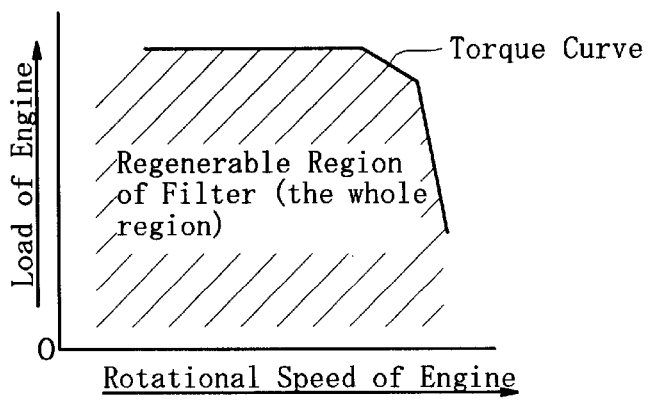

FIGS. 8 to 10 show an eighth embodiment of the present invention. This embodiment corresponds to claim 11. In FIG. 8, the same reference numeral as that in FIGS. 1, 3 and 4 denotes the same element.

In this embodiment, there are provided the accumulator fuel injection system 41 in the fourth embodiment, the turbocharger 31 in the third embodiment, and a low-pressure recirculation type EGR system 81 for recirculating some of exhaust gas in the exhaust pipe 13b to the intake pipe 12b. The EGR system 81 includes an EGR pipe 81a one end of which is connected to the exhaust pipe 13b on the exhaust gas downstream side of the case 14 and the other end of which is connected to the intake pipe 12b on the intake air upstream side of the compressor housing 31b by bypassing the engine 11, and an EGR valve 81b which is provided in the EGR pipe 81a so as to be capable of controlling the flow rate of exhaust gas recirculated from the exhaust pipe 13b to the intake pipe 12b through the EGR pipe 81a. Although not shown in the figure, the EGR valve 81b is a motor operated valve for controlling the opening of a valve body by driving a valve element by using a motor.

Also, deposit detecting means 87 is made up of the exhaust gas pressure sensors 17a and 17b for detecting the pressure of exhaust gas, the intake air amount sensor 47a for detecting the amount of intake air of the engine, and the exhaust gas temperature sensor 27a for detecting the temperature of exhaust gas. The exhaust gas pressure sensors 17a and 17b are inserted into the exhaust pipe 13b in front and in rear of the case 14, and the exhaust gas temperature sensor 27a is inserted in the exhaust pipe 13b on the exhaust gas upstream side of the case 14. The detection outputs of the exhaust gas pressure sensors 17a and 17b, the intake air amount sensor 47a, and the exhaust gas temperature sensor 27a are connected to the control inputs of the controller 18, and the control outputs of the controller 18 are connected to the electromagnetic valves for the injector 41a, the turbo back pressure actuator 31g, the EGR valve 81b, and the intake-side drive motor 22b of the intake air throttle valve 22. Also, the controller 18 is provided with a memory. The volume of exhaust gas passing through the filter 14b is calculated from the exhaust gas temperature and the intake air amount, and the deposit of particulates on the filter 14b is calculated from the aforementioned exhaust gas volume and a pressure difference between the front and rear of the filter 14b. Therefore, if the deposit of particulates exceeds a predetermined amount stored in the memory, it is judged that the regeneration time for the filter 14b has come. Further, the memory stores a regenerable region of the filter 14b which is changed according to the deposit of particulates on the filter 14b and the filter regeneration efficiency of the filter 14b (FIG. 10). The system of the eighth embodiment is configured in the same manner as the first embodiment excluding the above-described configuration.

The operation of the filtering means regenerating system configured as described above will be described with reference to FIGS. 8 to 10.

When a key switch is turned on to start the engine 11, the controller 18 calculates the deposit of particulates on the filter 14b based on the detection outputs of the exhaust gas pressure sensors 17a and 17b, the intake air amount sensor 47a, and the exhaust gas temperature sensor 27a. If the controller 18 judges that the deposit $W_f$ of particulates on the filter 14b is not larger than a predetermined amount $W_1$, it controls the engine 11 for ordinary operation (FIG. 10(a)). Next, if the controller 18 judges that the deposit $W_f$ of particulates on the filter 14b is larger than the predetermined amount $W_1$, at the time of low-load operation of the engine 11, the controller 18 decreases the opening of the EGR valve 81b, controls the turbo back pressure actuator 31g to throttle the movable stator blades more than usual, and further throttles the intake air throttle valve 22 in order to carry out general regenerating operation (FIG. 10(b)). If the opening of the EGR valve 81b is decreased, the EGR ratio decreases and the discharge amount of NO increases (the discharge amount of exhaust gas increases by 30% and more). If the movable stator blades are throttled more than usual, the pressure of exhaust gas increases, so that the temperature of exhaust gas rises (the temperature of exhaust gas rises by 30° C. and more) and the discharge amount of NO increases (the discharge amount of NO increases by 30% and more). Further, if the intake air throttle valve 22 is throttled, the air-fuel ratio decreases and the intake air resistance increases, so that the discharge amount of NO increases (the discharge amount of NO increases by 20% and more) and the temperature of exhaust gas rises (by 50° C. and more). As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed. Also, at the time of high-load operation of the engine 11 as well, the controller 18 decreases the opening of the EGR valve 81b, controls the turbo back pressure actuator 31g to throttle the movable stator blades more than usual, and further throttles the intake air throttle valve 22 as described above. As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed.

Simultaneously with the start of general regenerating operation control, a first regeneration timer $t_1$, starts. If the deposit $W_f$ decreases so as to be smaller than $W_2$ ($W_2<W_1$) within a predetermined time $T_1$, the control returns to the ordinary operation control. However, if the deposit $W_f$ does not decrease to an amount smaller than $W_2$ even if the predetermined time $T_1$ has elapsed, the control transfers to emergency regenerating operation control (FIG. 10(c)). Specifically, at the time of low-load operation of the engine 11, the controller 18 controls the electromagnetic valve for the injector 41a to delay the injection timing of fuel as compared with the usual injection time and to increase the injection amount of post-injection, decreases the opening of the EGR valve 81b, controls the turbo back pressure actuator 31g to throttle the movable stator blades more than usual, and further throttles the intake air throttle valve 22. If the main injection timing of fuel is delayed as compared with the usual injection timing, the exhaust gas temperature rises to a temperature at which the particulates can be oxidized by $NO_2$ and removed (the exhaust gas temperature rises by 100° C. and more). If the injection amount of post-injection is increased, HC is burned by the oxidation catalyst 14a, so that the filter temperature increases (the exhaust gas temperature rises by 100° C. and more). Also, if the opening of the EGR valve 81b is decreased, the EGR ratio decreases and the discharge amount of NO increases (the discharge amount of exhaust gas increases by 30% and more). If the movable stator blades are throttled more than usual, the pressure of exhaust gas increases, so that the temperature of exhaust gas rises (the temperature of exhaust gas rises by 30° C. and more) and the discharge amount of NO increases (the discharge amount of NO increases by 30% and more). Further, if the intake air throttle valve 22 is throttled, the air-fuel ratio decreases and the intake air resistance increases, so that the discharge amount of NO increases (the discharge amount of NO increases by 20% and more) and the temperature of exhaust gas rises (by 50° C. and more). As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed.

On the other hand, at the time of high-load operation, the controller 18 controls the electromagnetic valve for the injector 41a to advance the main injection timing of fuel as compared with the usual injection timing, decreases the opening of the EGR valve 81b, controls the turbo back pressure actuator 31g to throttle the movable stator blades more than usual, and further throttles the intake air throttle valve 22. If the injection timing of fuel is advanced as compared with the usual injection timing, the discharge amount of NO in exhaust gas increases (the discharge amount of NO increases by 30% and more). If the opening of the EGR valve 81b is decreased, the discharge amount of NO increases as described above. If the movable stator blades are throttled more than usual, the temperature of exhaust gas increases and the discharge amount of NO increases as described above. Further, if the intake air throttle valve 22 is throttled, the discharge amount of NO increases as described above. As a result, the exhaust gas temperature rises to a temperature at which the particulates can be oxidized by $NO_2$ and removed, and the discharge amount of NO in exhaust gas increases. Therefore, after NO in exhaust gas is oxidized into $NO_2$ by the oxidation catalyst 14a, the particulates deposited on the filter 14b are rapidly oxidized by the $NO_2$ and removed.

Simultaneously with the start of emergency regenerating operation control, a second regeneration timer $t_2$ starts. If the deposit $W_f$ decreases so as to be smaller than $W_3$ ($W_3<W_2$) within a predetermined time $T_2$ ($T_2<T_1$), the control returns to the ordinary operation control. However, if the deposit $W_f$ does not decrease to an amount smaller than $W_3$ even if the predetermined time $T_2$ has elapsed, an alarm lamp provided in an operator's seat to tell system abnormality is lighted. Therefore, the temperature of exhaust gas is made not lower than the predetermined value and the amount of $NO_2$ flowing into the filter 14b is made not smaller than the predetermined value in all operation statuses of the engine 11, so that the particulates deposited on the filter 14b can be rapidly oxidized by $NO_2$ and removed, by which the filter 14b can be prevented from becoming in an excessively collecting state.

Although the in-line fuel injection system having the variable timer mechanism has been described in the first to third embodiment, a distributor type fuel injection system having the variable timer mechanism may be used.

Also, although the controller controls the variable timer mechanism of the in-line fuel injection pump in the first embodiment, the controller may control any one apparatus selected from a group consisting of the EGR valve of EGR system, the variable stator blade of turbocharger, the variable valve timing mechanism, and the intake air throttle valve.

Also, the controller controls four apparatuses of the variable timer mechanism, the EGR valve, the intake air throttle valve, and the exhaust gas throttle valve in the second embodiment, and controls four apparatuses of the variable timer mechanism, the variable stator blade, the EGR valve, and the intake air throttle valve in the third embodiment. However, the controller may control two or three or more (two or three, or four, five, or six other than the above) apparatuses selected from a group consisting of the variable timer mechanism, the EGR valve, the variable stator blade, the variable valve timing mechanism, the intake air throttle valve, and the exhaust gas throttle valve.

Also, the controller controls the accumulator fuel injection system in the fourth embodiment, controls two apparatuses of the accumulator fuel injection system and the variable stator blade in the fifth embodiment, controls two apparatuses of the accumulator fuel injection system and the EGR valve in the sixth embodiment, controls three apparatuses of the accumulator fuel injection system, the EGR valve, and the variable valve timing mechanism in the seventh embodiment, and controls four apparatuses of the accumulator fuel injection system, the variable stator blade of turbocharger, the EGR valve, and the intake air throttle valve in the eighth embodiment. However, the controller may control one or two or more (one, or two other than the above, or three other than the above, or four, five, or six other than the above) apparatuses selected from a group consisting of the accumulator fuel injection system, the EGR valve, the variable stator blade, the variable valve timing mechanism, the intake air throttle valve, and the exhaust gas throttle valve.

Further, the combination of the deposit detecting means is not limited to the combinations in the first to eighth embodiments, and can be composed of one or two or more sensors selected from a group consisting of the exhaust gas pressure sensor, the engine rotation sensor, the engine load sensor, an engine operation timer, the intake air amount sensor, the NOx sensor, the $O_2$ sensor, and the exhaust gas temperature sensor.

In the first embodiment to the eighth embodiment, a filtering means has an oxidation catalyst 14a and a particulate filter 14b as shown in FIGS. 1 to 8. As a modified embodiment an oxidation catalyst such as Pt, Pd for oxidizing NO into $NO_2$ may be carried on the particulate filter 14b in addition to the oxidation catalyst 14a. Also, when such an oxidation catalyst is carried on a particulate filter, a filtering means according to the present invention may be an oxidation-catalyzed DPF (Diesel Particulate Filter) without installing any independent oxidation catalyst, such as catalyst 14a shown in FIG. 1.

As described above, according to the present invention, the filtering means regenerating system is configured so that there is provided any one apparatus selected from a group consisting of the variable timer mechanism for in-line fuel injection system or distributor type fuel injection system, the EGR valve of EGR system, the variable stator blade of turbocharger, the variable valve timing mechanism, and the intake air throttle valve, and the controller controls the aforementioned selected one apparatus based on the detection output of the deposit detecting means for detecting the deposit of particulates deposited on the particulate filter. Therefore, the temperature of exhaust gas is made not lower than the predetermined value and the amount of $NO_2$ flowing into the filter 14b is made not smaller than the predetermined value in all operation statuses of the engine, so that the particulates deposited on the filter can be rapidly oxidized by $NO_2$ and removed. As a result, the particulate filter can be prevented from becoming in an excessively collecting state in all operation statuses of the engine.

Also, if the filtering means regenerating system is configured so that there are provided two or three of more apparatuses selected from a group consisting of the variable timer mechanism, the EGR valve, the variable stator blade, the variable valve timing mechanism, the intake air throttle valve, and the exhaust gas throttle valve, and the controller controls the selected two, three, or more apparatuses based on the detection output of the deposit detecting means, the same effect as described above can be achieved.

Further, if the filtering means regenerating system is configured so that there are provided one or two or more apparatuses selected from a group consisting of the accumulator fuel injection system, the EGR valve, the variable stator blade, the variable valve timing mechanism, the intake air throttle valve, and the exhaust gas throttle valve, and the controller controls the selected one, two, or more apparatuses based on the detection output of the deposit detecting means, the same effect as described above can also be achieved.

What is claimed is:

1. A filtering means regenerating system for a diesel engine wherein filtering means is provided in an exhaust gas passage of said engine to oxidize NO in exhaust gas of said engine into $NO_2$, and to collect particulates in said exhaust gas passing through said exhaust gas passage to thereby oxidize said particulates by means of said $NO_2$ and remove the same at a temperature higher than a predetermined exhaust gas temperature, comprising:
    (1) a variable stator blade provided in a turbocharger for supercharging intake air in an intake air passage of said engine by means of energy of said exhaust gas to regulate the amount of said intake air supercharged into said intake air passage,
    (2) deposit detecting means for detecting the deposit of particulates deposited on said filtering means; and
    (3) a controller for controlling said variable stator blade based on the detection output of said deposit detecting means.

2. The filtering means regenerating system according to claim 1, wherein said filtering means comprises an oxidation catalyst provided in said exhaust gas passage of said engine to oxidize NO in said exhaust gas of said engine into $NO_2$, and a particulate filter provided in said exhaust gas passage on the exhaust gas downstream side of said oxidation catalyst to collect particulates in said exhaust gas passing through said exhaust gas passage to thereby oxidize said particulates by means of said $NO_2$ and remove the same at a temperature higher than a predetermined exhaust gas temperature.

3. The filtering means regenerating system according to claim 2, wherein said oxidation catalyst oxidizing NO into $NO_2$ is carried on said particulate filter.

4. The filtering means regenerating system according to claim 1, wherein said filtering means is a particulate filter on which an oxidation catalyst oxidizing NO in said exhaust gas of said engine into $NO_2$ is carried, and collects particulates in said exhaust gas to thereby oxidize said particulates by means of said $NO_2$ and remove the same at a temperature higher than a predetermined exhaust gas temperature.

5. The filtering means regenerating system according to claim 1, wherein said deposit detecting means is configured by one or two or more sensors selected from a group consisting of an exhaust gas pressure sensor for detecting the pressure of said exhaust gas, an engine rotation sensor for detecting the rotational speed of said engine, an engine load sensor for detecting the load of said engine, an engine operation timer for detecting the operation time of said engine, an intake air amount sensor for detecting the amount of intake air of said engine, an NOx sensor for detecting the concentration of NOx in said exhaust gas, an $O_2$ sensor for detecting the concentration of oxygen contained in said exhaust gas, and an exhaust gas temperature sensor for detecting the temperature of said exhaust gas.

6. The filtering means regenerating system according to claim 1, further comprising one or two or more apparatuses selected from a group consisting of
    (a) an intake air throttle valve provided in said intake air passage to control the opening of said intake air passage,
    (b) a variable timer mechanism for an in-line fuel injection system or distributor type fuel injection system, which regulates the injection timing of fuel injected into said engine, and
    (c) an EGR valve of an EGR system, which controls the flow rate of exhaust gas recirculated from said exhaust gas passage to said intake air passage of said engine,
    (d) a variable timing mechanism for changing the opening/closing timing and lifts of an intake air valve and exhaust gas valve of said engine according to the operation status of said engine, and
    (e) an exhaust gas throttle valve provided in said exhaust is said exhaust gas passage to control the opening of said exhaust gas passage,
        wherein the controller controls said selected one or two or more apparatuses together with the variable stator blade.

7. The filtering means regenerating system according to claim 6, wherein said filtering means comprises an oxidation catalyst provided in said exhaust gas passage of said engine to oxidize NO in said exhaust gas of said engine into $NO_2$, and a particulate filter provided in said exhaust gas passage on the exhaust gas downstream side of said oxidation catalyst to collect particulates in said exhaust gas passing through said exhaust gas passage to thereby oxidize said particulates by means of said $NO_2$ and remove the same at a temperature higher than a predetermined exhaust gas temperature.

8. The filtering means regenerating system according to claim 7, wherein said oxidation catalyst oxidizing NO into $NO_2$ is carried on said particulate filter.

9. The filtering means regenerating system according to claim 6, wherein said filtering means is a particulate filter on which an oxidation catalyst oxidizing NO in said exhaust gas of said engine into $NO_2$ is carried, and collects particulates in said exhaust gas to thereby oxidize said particulates by means of said $NO_2$ and remove the same at a temperature higher than a predetermined exhaust gas temperature.

10. The filtering means regenerating system according to claim 6, wherein said deposit detecting means is configured by one or two or more sensors selected from a group consisting of an exhaust gas pressure sensor for detecting the pressure of said exhaust gas, an engine rotation sensor for detecting the rotational speed of said engine, an engine load sensor for detecting the load of said engine, an engine operation timer for detecting the operation time of said engine, an intake air amount sensor for detecting the amount of intake air of said engine, an NOx sensor for detecting the concentration of NOx in said exhaust gas, an $O_2$ sensor for detecting the concentration of oxygen contained in said exhaust gas, and an exhaust gas temperature sensor for detecting the temperature of said exhaust gas.

11. A filtering means regenerating system for a diesel engine wherein filtering means is provided in an exhaust gas passage of said engine to oxidize NO in exhaust gas of said engine into $NO_2$, and to collect particulates in said exhaust gas passing through said exhaust gas passage to thereby oxidize said particulates by means of said $NO_2$ and remove the same at a temperature higher than a predetermined exhaust gas temperature, comprising:

(1) a variable stator blade provided in a turbocharger for supercharging intake air in an intake air passage of said engine by means of energy of said exhaust gas to regulate the amount of said intake air supercharged into said intake air passage, (2) an accumulator fuel injection system, which regulates either one or both of the injection timing and injection amount of fuel injected into said engine;

(3) deposit detecting means for detecting the deposit of particulates deposited on said filtering means; and (4) a controller for controlling said variable stator blade and said accumulator fuel injection system based on the detection output of said deposit detecting means.

12. The filtering means regenerating system according to claim 11, wherein said filtering means comprises an oxidation catalyst provided in said exhaust gas passage of said engine to oxidize NO in said exhaust gas of said engine into $NO_2$, and a particulate filter provided in said exhaust gas passage on the exhaust gas downstream side of said oxidation catalyst to collect particulates in said exhaust gas passing through said exhaust gas passage to thereby oxidize said particulates by means of said $NO_2$ and remove the same at a temperature higher than a predetermined exhaust gas temperature.

13. The filtering means regenerating system according to claim 12, wherein said oxidation catalyst oxidizing NO into $NO_2$ is carried on said particulate filter.

14. The filtering means regenerating system according to claim 11, wherein said filtering means is a particulate filter on which an oxidation catalyst oxidizing NO in said exhaust gas of said engine into $NO_2$ is carried, and collects particulates in said exhaust gas to thereby oxidize said particulates by means of said $NO_2$ and remove the same at a temperature higher than a predetermined exhaust gas temperature.

15. The filtering means regenerating system according to claim 11, wherein said deposit detecting means is configured by one or two or more sensors selected from a group consisting of an exhaust gas pressure sensor for detecting the pressure of said exhaust gas, an engine rotation sensor for detecting the rotational speed of said engine, an engine load sensor for detecting the load of said engine, an engine operation timer for detecting the operation time of said engine, an intake air amount sensor for detecting the amount of intake air of said engine, an NOx sensor for detecting the concentration of NOx in said exhaust gas, an $O_2$ sensor for detecting the concentration of oxygen contained in said exhaust gas, and an exhaust gas temperature sensor for detecting the temperature of said exhaust gas.

16. The filtering means regenerating system according to claim 11, further comprising one or two or more apparatuses selected from a group consisting of (a) an intake air throttle valve provided in said intake air passage to control the opening of said intake air passage, (b) an EGR valve of an EGR system, which controls the flow rate of exhaust gas recirculated from said exhaust gas passage to said intake air passage of said engine, (c) a variable timing mechanism for changing the opening/closing timing and lifts of an intake air valve and exhaust gas valve of said engine according to the operation status of said engine, and (d) an exhaust gas throttle valve provided in said exhaust is said exhaust gas passage to control the opening of said exhaust gas passage, wherein the controller controls said selected one or two or more apparatuses together with the variable stator blade and the accumulator fuel injection system.

17. The filtering means regenerating system according to claim 16, wherein said filtering means comprises an oxidation catalyst provided in said exhaust gas passage of said engine to oxidize NO in said exhaust gas of said engine into $NO_2$, and a particulate filter provided in said exhaust gas passage on the exhaust gas downstream side of said oxidation catalyst to collect particulates in said exhaust gas passing through said exhaust gas passage to thereby oxidize said particulates by means of said $NO_2$ and remove the same at a temperature higher than a predetermined exhaust gas temperature.

18. The filtering means regenerating system according to claim 17, wherein said oxidation catalyst oxidizing NO into $NO_2$ is carried on said particulate filter.

19. The filtering means regenerating system according to claim 16, wherein said filtering means is a particulate filter on which an oxidation catalyst oxidizing NO in said exhaust gas of said engine into $NO_2$ is carried, and collects particulates in said exhaust gas to thereby oxidize said particulates by means of said $NO_2$ and remove the same at a temperature higher than a predetermined exhaust gas temperature.

20. The filtering means regenerating system according to claim 16, wherein said deposit detecting means is configured by one or two or more sensors selected from a group consisting of an exhaust gas pressure sensor for detecting the pressure of said exhaust gas, an engine rotation sensor for detecting the rotational speed of said engine, an engine load sensor for detecting the load of said engine, an engine operation timer for detecting the operation time of said engine, an intake air amount sensor for detecting the amount of intake air of said engine, an NOx sensor for detecting the concentration of NOx in said exhaust gas, an $O_2$ sensor for detecting the concentration of oxygen contained in said exhaust gas, and an exhaust gas temperature sensor for detecting the temperature of said exhaust gas.

* * * * *